UNITED STATES PATENT OFFICE.

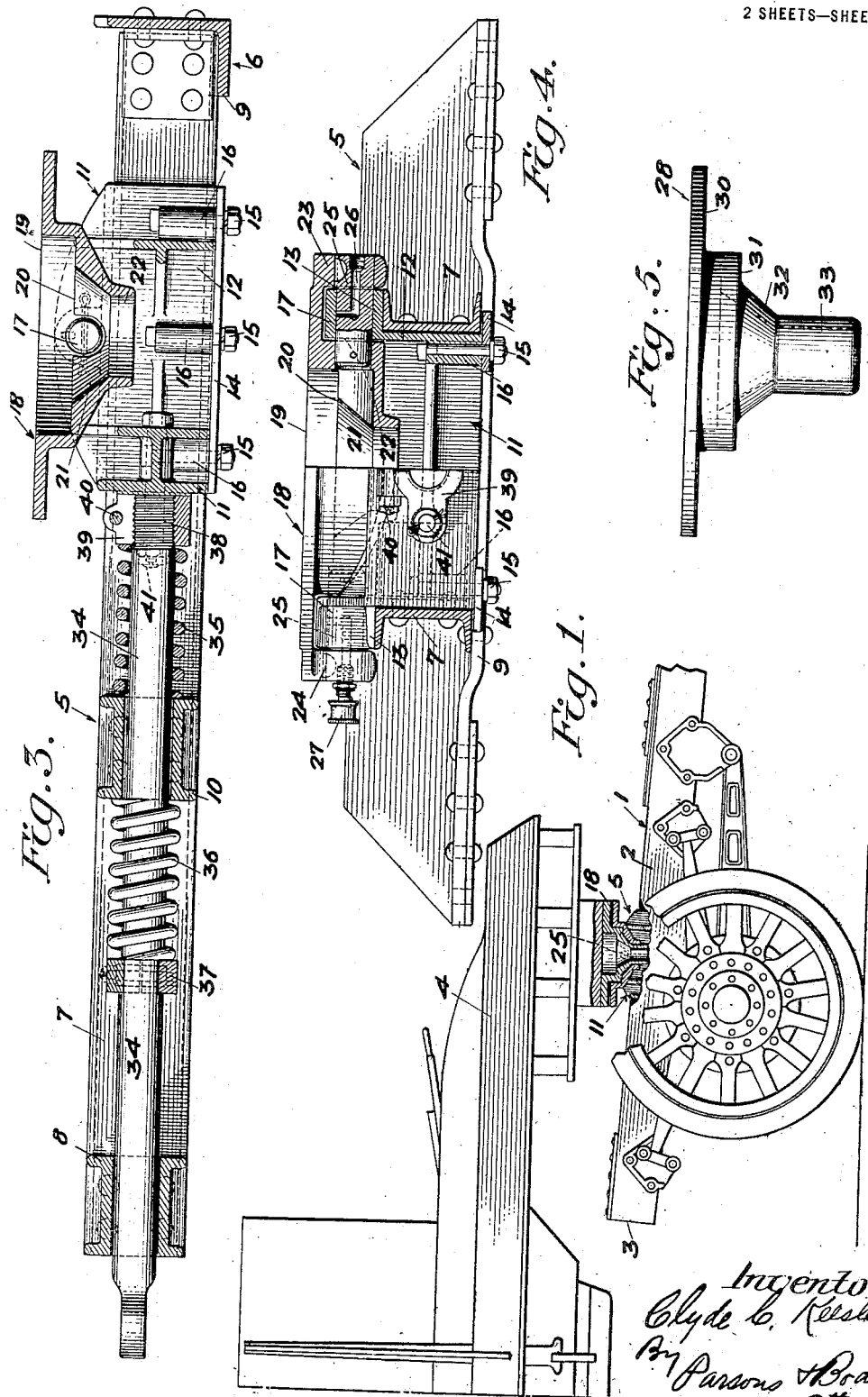
C. C. KEESLER.
FIFTH WHEEL CONSTRUCTION.
APPLICATION FILED FEB. 9, 1917.
1,288,425.
Patented Dec. 17, 1918.
2 SHEETS—SHEET 1.

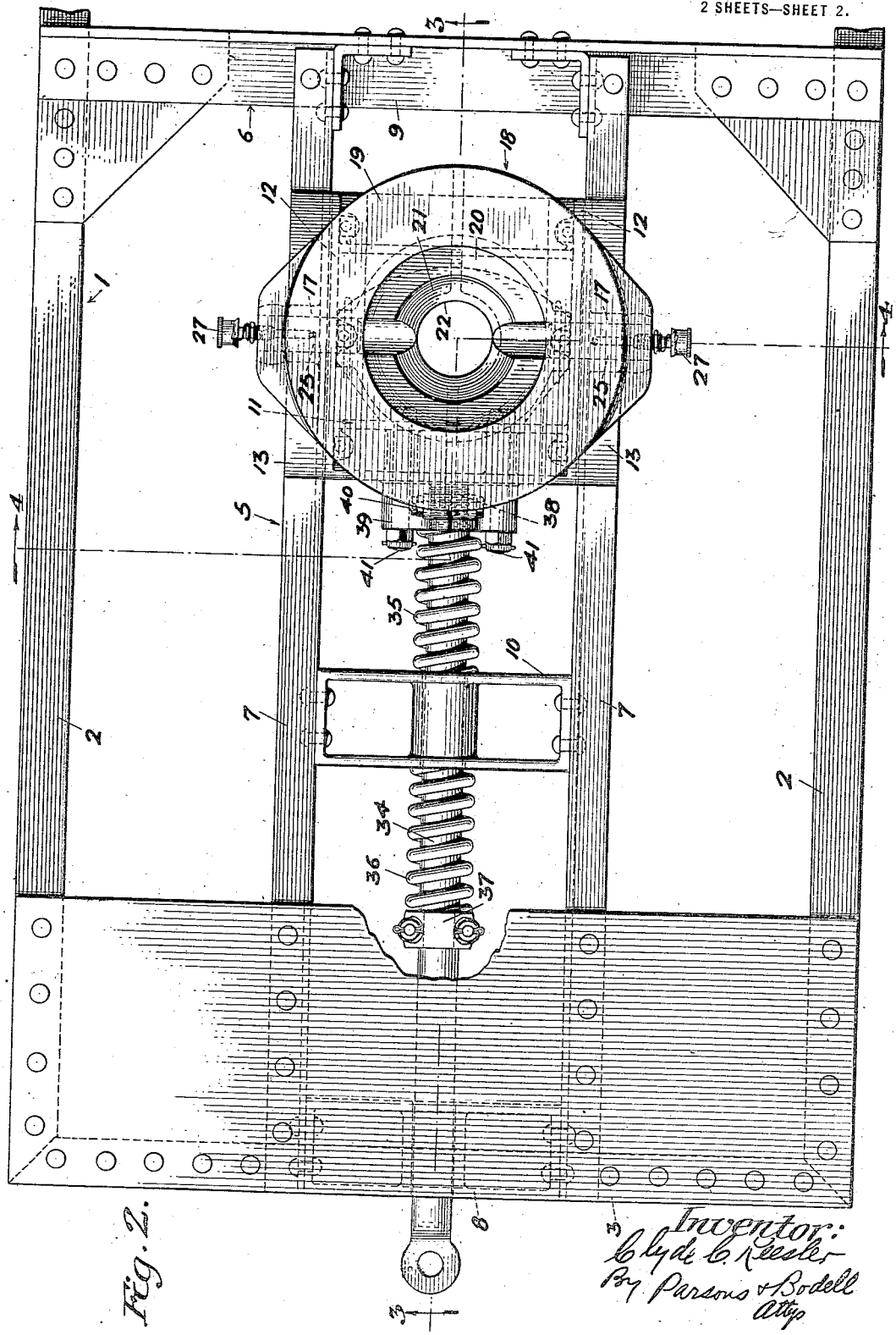

CLYDE C. KEESLER, OF CANASTOTA, NEW YORK, ASSIGNOR TO WATSON WAGON COMPANY, OF CANASTOTA, NEW YORK, A CORPORATION OF NEW YORK.

FIFTH-WHEEL CONSTRUCTION.

1,288,425.   Specification of Letters Patent.   Patented Dec. 17, 1918.

Application filed February 9, 1917. Serial No. 147,581.

*To all whom it may concern:*

Be it known that I, CLYDE C. KEESLER, a citizen of the United States, and a resident of Canastota, in the county of Madison and State of New York, have invented a certain new and useful Fifth-Wheel Construction, of which the following is a specification.

This invention relates to fifth wheel construction and has for its object a construction particularly applicable for connecting tractors to what are known as semi-trailers, which construction is particularly simple and economical and highly efficient and durable in use, and the invention consists in the combinations and constructions hereinafter set forth and claimed.

In describing this invention, reference is had to the accompanying drawings in which like characters designate corresponding parts in all the views.

Figure 1 is a fragmentary elevation, partly in section, of the rear end of a tractor and the front end of a semi-trailer provided with my invention.

Fig. 2 is a plan view of the rear end of the tractor frame showing the fifth wheel unit attached thereto.

Fig. 3 is a longitudinal sectional view on line 3—3, Fig. 2.

Fig. 4 is a transverse sectional view, partly in elevation, on the plane of line 4—4, Fig. 2.

Fig. 5 is a detail view of the upper fifth wheel section.

This fifth wheel construction comprises generally a forwardly and rearwardly movable carriage, a fifth wheel section pivotally mounted on the carriage on a transverse axis, means for resisting the forward and rearward movement of the carriage, and an upper section complemental to the lower section.

I have here shown my invention as applied to a tractor and a semi-trailer for which it is especially adapted, but obviously it may be used in other situations.

1 designates the tractor frame which includes side sills 2 and an end bar 3.

4 designates the semi-trailer, that is, a trailer which is supported at its rear end by ground wheels, and connected at its front end to the tractor by the fifth wheel connection.

5 designates the fifth wheel unit associated with the tractor, this unit being a frame T-shaped in general form, the leg of the T extending lengthwise of the tractor frame midway between the sills, and the head 6 of the T being rigidly secured at its ends to the sills.

The leg of the T is secured at its end to the rear cross bar 3 of the tractor frame. As here shown, the leg of the T is composed of two channel bars 7 arranged with their channels facing outwardly and connected at their ends by braces 8, 9, and intermediate of their ends by a similar brace 10 which acts as a spring abutment as hereinafter described.

11 is the forwardly and rearwardly movable carriage mounted on the bars 7 and slidable along the same, the carriage having sliding interlocking engagement with the bars 7 so that the carriage cannot be unintentionally detached, and as here shown, the carriage is provided with flanges 12 engaging the inner faces of the bars 7, horizontal flanges 13 which slide along the upper faces of the bars 7 and also with additional horizontal detachable flanges 14 which engage the under faces of the bars and which are secured in position by bolts 15 extending vertically through the flanges 14 and through the bosses 16 provided on the inner sides of the flanges 12. The flanges 12, 13, 14 form grooves or ways which receive the bars 7.

The carriage 11 is also provided with horizontal bearings 17 located on the upper sides of the flanges 13 midway between the front and rear ends of the carriage.

18 designates the lower fifth wheel section which is formed with upwardly facing concentric bearing faces 19, 20, and 21 arranged in different planes and with a central vertical bearing 22, the face 19 being on the extreme upper side of the section 18, the face 20 being depressed below the face 19 and the face 21 being preferably conical and extending from a bearing face 20 to the upper end of the vertical bearing 22. A vertical annular bearing face is located between the flat faces 19 and 20 and the conical bearing face 21 extends from the horizontal bearing face 20 to the vertical bearing 22, this vertical bearing 22 constituting a vertical annular bearing face of less diameter than the vertical annular bearing face located between the planes of the faces 19 and 20.

The section 18 is also formed with a bearing 23 or 24 on each side thereof arranged to come into alinement with opposite ends of the contiguous bearing 17 of the carriage 11, and to receive a trunnion or spindle 25 which extends through each bearing 23, 24 and companion bearing 17. Each spindle 25 may be provided with a suitable oil duct 26 and with a grease cup 27.

28 is the upper fifth wheel section and is associated with the semi-trailer which is constructed to be moved out of engagement with the lower section 18 by a vertical movement upwardly, the section 28 having faces complemental to the bearing faces of the upper section 18, it having downwardly facing concentric bearing faces 30, 31, 32, and the central stud 33 complemental to the faces 19, 20, and 21 and the bearing 22 of the lower fifth wheel section 18. The vertical axis of the fifth wheel section intersects the rocking axis of the lower section. Owing to the arrangement of the complemental bearing faces of the fifth wheel sections 18 and 28, the stud 33 if it for any reason becomes dislodged from the bearing 22, will not move free of the lower section 18, but will move up the conoidal face 21 of the lower section and engage the vertical annular face of the lower fifth wheel section 18 which face is located between the horizontal faces 19 and 20.

34 is a draw and push bar extending rearwardly from the carriage 11 and located midway between the guide bars 7 and slidable in suitable passages in the brackets 8 and 10, this bar 34 having an eye or other means at its rear end for coupling to a trailer to be drawn in the usual manner when a semi-trailer is not attached to the tractor.

The spring means for resisting the forward and rearward movement of the carriage 11 is associated with this bar 34. As here shown two springs 35, 36 are employed. The spring 35 is located between the front side of the bracket or abutment 10 and the carriage 11 in order to resist rearward movement of the carriage, and the spring 36 is interposed between the rear side of the abutment 10 and the collar 37 fixed on the rod 34, the spring 36 resisting forward movement of the carriage 11.

The bar 34 is suitably attached to the carriage and as here shown it threads at its front end at 38 in a split bearing 39 which is clamped onto the threaded end 38 by a bolt 40 and which is secured to the carriage by means of bolts 41.

This fifth wheel construction is particularly advantageous in that it can be readily applied to the tractor frames and in that owing to its pivotal movement the tractor frame can have relative up and down rocking movement relatively to the trailer as when the tractor and trailer are moving over uneven ground or on a grade, and furthermore the construction is particularly advantageous in that a draw and push bar is united with the fifth wheel construction.

What I claim is:

1. A fifth wheel construction comprising a guide, a carriage movable along the guide, a fifth wheel section mounted on the carriage, a draw and push bar connected to the carriage and extending lengthwise of the guide, a stationary abutment through which said bar slides, a collar on the bar and opposed to the abutment, a spring interposed between one side of the abutment and the collar, and a spring interposed between the collar and the other side of the abutment, substantially as and for the purpose set forth.

2. A fifth wheel construction comprising a guide including parallel bars, a carriage mounted on and slidable along the bars, a fifth wheel section mounted on the carriage, an abutment extending from one of the bars to the other, a draw and push bar extending midway between the guide bars, and through the abutment and being connected at one end to the carriage, a spring interposed between one side of the abutment and the carriage, a collar mounted on the draw and push bar on the opposite side of the abutment, and a second spring interposed between the collar and said abutment, substantially as and for the purpose described.

3. The combination with a tractor frame, including side sills and an end member, of a fifth wheel section including a T-shaped frame including lengthwise guide bars parallel to the side sills of the tractor frame, and the opposite ends of the head of the T being secured to the side sills and the foot of the T shaped frame being secured to the end bar of the frame, a carriage movable along the guide bars, a fifth wheel section mounted on the carriage, and spring means for resisting sliding movement of the carriage, substantially as and for the purpose specified.

4. A fifth wheel construction comprising a guide, a carriage movable along the guide, a fifth wheel section mounted on the carriage, and a draw bar extending lengthwise of the guide and connected to the carriage, substantially as and for the purpose set forth.

5. A fifth wheel construction comprising a guide, a carriage movable along the guide, a fifth wheel section mounted on the carriage, a draw bar extending lengthwise of the guide and connected to the carriage, and a spring arranged to resist movement of the carriage by the draw bar, substantially as and for the purpose described.

6. A fifth wheel construction comprising a guide including parallel bars, a carriage slidable along the bars, and having bearings thereon, a fifth wheel section pivotally mounted on the carriage to rock about a transverse axis, the pivotal bearings of the fifth wheel section and the carriage being located directly over said guide members and said bearings of the carriage extending to the front of and to the rear of the transverse pivotal axis of the fifth wheel section thereby providing a wide bearing surface for the carriage on the guide, substantially as and for the purpose specified.

7. A fifth wheel construction comprising a pair of parallel guide bars, a carriage slidable along the bars and slidably interlocking therewith whereby the carriage is held from detachment from the bars, the carriage being formed with transverse horizontal bearings, and a fifth wheel section having spindles journaled in the horizontal bearings, a draw and push bar extending lengthwise of the guide bars between the same, and spring means arranged to resist movement of the carriage in opposite directions, substantially as and for the purpose specified.

8. A fifth wheel construction comprising upper and lower sections, the lower section being formed with annular vertical bearing faces of different diameters, the upper bearing face being of greater diameter than the lower, a horizontal face at the lower end of the upper vertical face and a conoidal face extending between the inner margin of the horizontal face and the upper end of the lower vertical face, the upper section also having vertical bearing faces of different diameters complemental to the vertical bearing faces of the lower section, substantially as and for the purpose described.

9. A fifth wheel construction comprising upper and lower sections, the lower section being formed with upwardly facing bearing faces arranged in different planes and with a central opening, and the upper section being formed with downwardly extending faces and a central depending stud complemental to the bearing faces and opening of the lower section, and the lower section being pivotally mounted on a transverse axis intersecting the vertical axis of the fifth wheel, substantially as and for the purpose described.

In testimony whereof, I have hereunto signed my name, at Syracuse, in the county of Onondaga, and State of New York, this 15th day of December, 1916.

CLYDE C. KEESLER.